Nov. 28, 1933.   A. SCHMID   1,936,861
APPARATUS FOR THE TREATMENT OF RAW CEMENT SLUDGE
Filed June 19, 1931
Fig. 1.
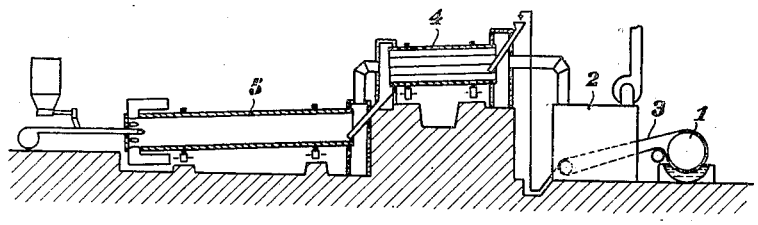
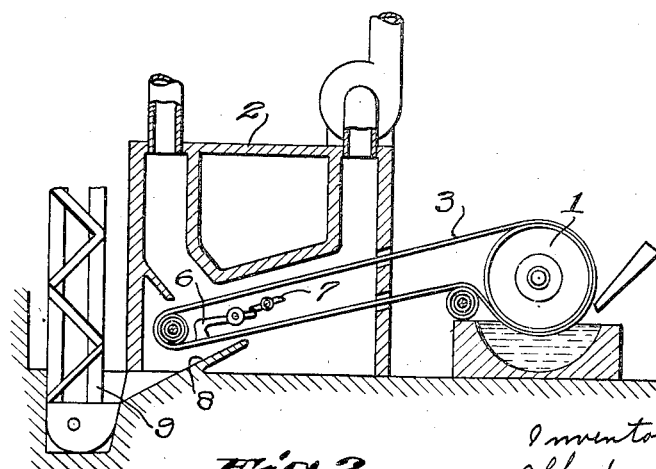
Fig. 2.
Inventor:
Alfred Schmid
By Knight Bros.
attys.

Patented Nov. 28, 1933

1,936,861

UNITED STATES PATENT OFFICE 1,936,861

APPARATUS FOR THE TREATMENT OF RAW CEMENT SLUDGE

Alfred Schmid, Magdeburg, Germany, assignor to firm Fried. Krupp Grusonwerk Aktiengesellschaft, Magdeburg-Buckau, Germany Application June 19, 1931, Serial No. 545,585, and in Germany June 25, 1930

3 Claims. (Cl. 222—7)

This invention relates to apparatus for the treatment of raw cement sludge in which a rotary tube furnace is employed for calcining the sludge. It is already known to connect in front of a rotary tube furnace a mechanical device as for example a filter for removing water from the wet sludge. In such an arrangement, however, the heat of the exhaust gases of the rotary tube furnace is not utilized. It has, furthermore, been proposed to concentrate the raw cement sludge before its delivery into the rotary tube furnace, by the employment of the heat of the exhaust gases. The complete drying of the sludge then takes place in the rotary tube furnace itself.

It is the chief object of the invention to provide an improved apparatus in which the heat of the exhaust gases issuing from the rotary tube furnace may be utilized as far as possible in a pretreatment of the raw cement sludge.

According to the invention there is provided between the water removing device and the rotary tube furnace a drying and pre-heating device heated by the exhaust gases of the rotary tube furnace and which practically utilize completely the heat of the exhaust gases of the rotary tube furnace.

First, the water from the raw cement sludge containing about 35–40% of water is mechanically removed down to about 20%, for example by means of the filter. The sludge is then carried through a drying apparatus of any suitable kind heated by the exhaust gases of the rotary tube furnace and then the material the water content of which is thus practically reduced to 0% is transferred to a pre-heating device heated also by the exhaust gases of the rotary tube furnace. In the pre-heating device, the heat of the exhaust gases is so far utilized, that is, is so far reduced, that the remaining quantity of heat exactly suffices to cover the requisite amount of heat necessary for use in the drying apparatus. In this way, it is possible practically completely to utilize the heat of the exhaust gases.

In the drying process, the exhaust gases leave the rotary tube furnace generally at a temperature of about 700° C. By the use of a pre-heating apparatus which may comprise a suitable casing the cross-sectional area of which may increase and may be subdivided by the provision of tubes and may be provided with chains, or otherwise suitably constructed it is possible to reduce the temperature of the exhaust gases leaving the pre-heating device to 400° C. or below. With such an exhaust gas temperature, the heat still contained in the exhaust gases can be practically entirely utilized in the drying apparatus. Such a heat utilization has not, however, hitherto been attainable in the wet process of treating sludge.

In order that the said invention may be clearly understood and readily carried into effect the same will now be more fully described with reference to the accompanying drawing which illustrates by way of example and somewhat diagrammatically a rotary tube furnace installation constructed according to the invention.

Fig. 1 is a somewhat diagrammatic vertical longitudinal section of the apparatus, and Fig. 2 is a detail vertical section of the right end of the apparatus shown in Fig. 1 on a larger scale.

In the drawing the apparatus for the mechanical removal of water from the raw cement sludge is represented by a filter 1 to which the sludge is fed with about a 35 to 40% water content. The filtered product passes from the filter into the drying apparatus 2, in which it is practically fully dried. The filtering takes place for example in a drum filter around which are arranged in a known manner, cords or wire fabric bands 3 to which adheres the filtered material. These cords or wire fabric bands run from the drum directly through the drying apparatus 2, thus serving also as a conveying device. By means of a shaking or knocking device, such as pivoted hammer 6 actuated by cam 7, the material, mostly in lump form, is removed from the conveying device and fed by a chute 8 into a bucket conveyor 9, which delivers it to a pre-heating or pre-burning apparatus 4 of a rotary tube furnace 5. In this pre-heating device the material is traversed by the exhaust gases of the rotary tube furnace, so that it absorbs a considerable portion of the exhaust gas heat and is thereby pre-heated or pre-burnt. The pre-heating device if desired may be rigidly connected with the rotary tube furnace.

The exhaust gases leave the pre-heating device at a temperature of about 400° C. and then pass into the drying apparatus for the purpose of drying the sludge therein. The temperature of the exhaust gases is further reduced by the drying process to about 100° C. so that the exhaust gases of the furnace are thus utilized practically to the utmost limit.

What I claim is:

1. In an apparatus for the treatment of raw cement sludge, a filter comprising a sludge container, a filter drum dipping below the sludge level in said container, and an endless filter band travelling around said drum; a drying chamber, guide means whereby said filter band conveying sludge is made to travel through said chamber; a rotary kiln; means for conveying dried sludge from said drying chamber to said kiln, and means for conducting waste gases from said kiln through said drying chamber.

2. Apparatus as described in claim 1, in combination with means for heating and shaking said filter band when it has traversed said drying chamber, to remove the dried material therefrom.

3. Apparatus as described in claim 1, in combination with a preheating device interposed between said drying chamber and rotary kiln and adapted to receive the dried material from said drying chamber, to raise the temperature thereof, and to transfer said material in preheated condition to said kiln, and means for conducting waste gases from said kiln first through said preheating device and then through said drying chamber.

ALFRED SCHMID.